US012716273B2

(12) United States Patent
Reddmann

(10) Patent No.: US 12,716,273 B2
(45) Date of Patent: Aug. 25, 2026

(54) MOTOR VEHICLE LOCK

(71) Applicant: KIEKERT AKTIENGESELLSCHAFT, Heiligenhaus (DE)

(72) Inventor: Uwe Reddmann, Essen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 118 days.

(21) Appl. No.: 18/714,818

(22) PCT Filed: Nov. 16, 2022

(86) PCT No.: PCT/DE2022/100855
§ 371 (c)(1),
(2) Date: May 30, 2024

(87) PCT Pub. No.: WO2023/104237
PCT Pub. Date: Jun. 15, 2023

(65) Prior Publication Data

US 2025/0027345 A1 Jan. 23, 2025

(30) Foreign Application Priority Data

Dec. 7, 2021 (GB) ........................ 10 2021 132 141

(51) Int. Cl.
*E05B 81/06* (2014.01)
*E05B 81/16* (2014.01)
(Continued)

(52) U.S. Cl.
CPC .............. *E05B 81/16* (2013.01); *E05B 81/06* (2013.01); *E05B 81/34* (2013.01)

(58) Field of Classification Search
CPC ........... Y10T 292/1082; Y10T 292/308; E05B 77/26
See application file for complete search history.

(56) References Cited

U.S. PATENT DOCUMENTS 6,155,124 A * 12/2000 Wirths .................... E05B 81/25 292/201
6,390,517 B1 * 5/2002 Ehret ...................... E05B 81/14 292/216

(Continued)

FOREIGN PATENT DOCUMENTS

DE 19617428 C2 * 6/1998 ............. E05B 77/30
DE 19650661 A1 * 6/1998 ............. E05B 81/15

(Continued)

OTHER PUBLICATIONS

International Search Report mailed Feb. 6, 2023, for priority International Application No. PCT/DE2022/100855.

*Primary Examiner* — Carlos Lugo
(74) *Attorney, Agent, or Firm* — Renner, Otto, Boisselle & Sklar, LLP

(57) ABSTRACT

A motor vehicle lock, in particular a motor vehicle door lock, which is equipped with a locking mechanism consisting substantially of a rotary latch and a pawl. An electromotive drive is also implemented, which performs actuating movements using a drive element. There is also a blocking element for the drive element. According to the invention, the blocking element is designed as a blocking lever which is rotatable about a pin and which pivots into its blocking position by means of an actuating movement of the drive element. In this way, the actuating movement of the drive element and a subsequent reversing movement take place in a purely motorized manner and without spring force, specifically until the blocking position is reached.

11 Claims, 3 Drawing Sheets

(51) Int. Cl.
*E05B 81/34* (2014.01)
*E05B 81/14* (2014.01)

(56) References Cited

U.S. PATENT DOCUMENTS

| | | | | |
|---|---|---|---|---|
| 6,565,131 | B2 * | 5/2003 | Roos | E05B 81/14 292/216 |
| 6,575,507 | B2 * | 6/2003 | Reddmann | E05B 81/14 292/201 |
| 9,677,305 | B2 * | 6/2017 | Bendel | E05B 81/14 |
| 2017/0009494 | A1 * | 1/2017 | Scholz | E05B 77/08 |

FOREIGN PATENT DOCUMENTS

| | | | | |
|---|---|---|---|---|
| DE | 10258390 | A1 | 6/2004 | |
| DE | 202012001961 | U1 | 5/2013 | |
| DE | 102017124521 | A1 | 4/2019 | |
| DE | 102019111936 | A1 | 11/2020 | |
| DE | 102019126596 | A1 | 4/2021 | |
| EP | 1061212 | A2 | 12/2000 | |
| EP | 1113133 | A1 | 7/2001 | |
| EP | 1884611 | A2 * | 2/2008 | E05B 77/04 |
| EP | 3907358 | A1 * | 11/2021 | E05B 81/42 |
| WO | 2004018808 | A1 | 3/2004 | |
| WO | WO-2019058164 | A1 * | 3/2019 | E05B 81/06 |
| WO | WO-2020224707 | A1 * | 11/2020 | E05B 81/06 |
| WO | 2020253912 | A1 | 12/2020 | |
| WO | WO-2021205251 | A1 * | 10/2021 | E05B 81/34 |

* cited by examiner

MOTOR VEHICLE LOCK

This application is a national phase of International Patent Application No. PCT/DE2022/100855 filed Nov. 16, 2022, which claims priority to German Patent Application No. 10 2021 132 141.7 filed Dec. 7, 2021, each of which is hereby incorporated herein by reference in its entirety.

FIELD OF DISCLOSURE

The invention relates to a motor vehicle lock, in particular a motor vehicle door lock, with a locking mechanism substantially comprising a rotary latch and a pawl, and further having an electromotive drive which performs actuating movements with the aid of a drive element, and with a blocking element for the drive element.

BACKGROUND OF DISCLOSURE

Vehicle locks with electric motor drives are used in many different ways in practice and are described in the literature. The actuating movements implemented with the aid of the electric motor drive can be a so-called electrical opening, for example. Here, the drive element ensures that the locking mechanism, which is regularly in the main closed position and is substantially made up of a rotary latch and pawl, is opened. In such a case, the drive element acts directly or indirectly upon the pawl and lifts it from its latching engagement with the rotary latch. As a result, the latch can open in a spring-assisted manner and release a previously held locking bolt. The associated motor vehicle door is open.

However, in addition to such an opening movement or electrical opening with the aid of the drive element, other actuating movements can also be realized with such an electric motor drive. This generally includes securing positions. These securing positions can be functional positions such as "locked/unlocked," "theft-secured/theft-unsecured," or "child-secured/child-unsecured." For example, this is the procedure in the prior art according to EP 1 113 133 A1.

Furthermore, embodiments are known from the generic prior art according to DE 10 2017 124 521 A1, in which the drive element can be used not only to open/close the locking mechanism electrically, but also to control additional elements such as for example a coupling element. That is, by using a (single) electric motor drive, different actuating movements such as electrical opening or the controlling of a securing position can be realized and implemented.

The procedure in the also generic prior art according to DE 20 2012 001 961 U1 is similar. In this case, stops are provided on a common stop contour. The drive element also has a center-zero spring so that it can be used to return to a so-called neutral position or base position after an actuating movement.

The prior art has basically proven its effectiveness when it comes to using an electromotive drive not only to open the lock, for example, but also to be able to define one or more other functional positions or securing positions at the same time. This already reduces the design effort compared to previous embodiments because only one (single) electric motor drive is used. However, the typical procedure at this point is that the drive element is reversed to its base position, after an actuating movement, by tensioning a spring assigned to the drive element, or generally to the electric motor drive, beforehand during the actuating movement. This spring can then relax during the reversing process.

Such a procedure leads to an overall reduction in the electrical power provided by the electric motor drive because, in addition to, for example, a power-consuming opening process of the lock, the spring assigned to the drive element must also be tensioned during the actuating movement in question, in particular during opening with an electric motor. In addition, this may cause problems in practice in that the base position or neutral position reached by the spring relaxing may in some circumstances not be reproducible. That is, it is conceivable that undesired or undefined actuating movements are carried out.

For this purpose, in practice and also in the literature, one or more sensors are sometimes used to, for example, monitor the position of the drive element. However, this increases the technological effort, especially since the monitoring of the actuating movement of the drive element is naturally not sufficient to avoid or cancel undefined actuating movements. That is because this would require an additional and appropriately controlled actuation of the electric motor drive.

SUMMARY OF DISCLOSURE

Accordingly, the present invention is based upon the technical problem of further developing a motor vehicle lock of this type in such a way that the actuating movements of the drive element are realized and implemented without loss of power, and taking into account a structurally simple design.

To solve this technical problem, a standard motor vehicle lock, and in particular a motor vehicle door lock in the context of the invention, is characterized in that the blocking element is designed as a blocking lever, rotatable about a pin, which pivots into its blocking position by an actuating movement of the drive element, so that the actuating movement and a subsequent reversing movement of the drive element take place in a purely motorized manner and without spring force until the blocking position is reached.

In this way, according to the invention, a spring or return spring assigned to the drive element or generally to the electric motor drive, which ensures that the drive element reverses to the base position after its actuating movement, can, to begin with, be omitted. Rather, according to the invention, this reversing movement and also the actuating movement take place in a purely motorized manner and without spring force. The invention is based upon the recognition that the actuating movement is blocked in this case by two, mechanically acting stops, so that any sensors for querying the position of the drive element can also be omitted.

A stop in the actuating movement corresponds to the actuating position being reached and, for example, the pawl being completely lifted off the rotary latch. For this purpose, the pawl is typically and usually assigned a stop anyway, which in this case also acts as a stop for the drive element. Starting from this position, the drive element is now reversed with the aid of the electric motor drive, and indeed, according to the invention, in purely motorized fashion and without spring force. The reversing movement continues until the blocking position of the drive element is reached. In this case, too, the drive element moves against a mechanical stop, which is provided by the blocking lever that has previously been pivoted into its blocking position.

The design is such that the drive element transfers the blocking lever to the blocking position through its actuating movement. This can be carried out and realized in detail in such a way that a contour on the drive element transfers the blocking lever from its base position to the blocking position accordingly.

In this way, the drive element is transferred from its actuating position to the blocking position in a purely motorized manner and without spring force, in a manner defined and limited by mechanical stops. This suppresses undesirable actuating movements and also expressly dispenses with the need for additional sensory monitoring or any need to track the drive element using the electric motor drive. These are the main advantages.

In an advantageous embodiment, a locking element is assigned to the blocking lever, which holds the blocking lever releasably in the blocking position. The locking element is advantageously such that it releases the blocking lever when the drive element reaches the blocking position. As soon as the drive element is reversed from the actuating position and, during this process, reaches the blocking lever in the blocking position and strikes against it, the locking element holding the blocking lever is released at the same time. As a result, the blocking lever can then be returned to its base position. Nevertheless, the blocking lever has previously provided the blocking position for the drive element.

The locking element in question is typically a locking angle lever that can be rotated about a pin. That is, the locking element is designed as an angle lever with a locking function, i.e., as a locking angle lever. The design is also such that the pin of the locking lever and the pin of the locking angle lever are arranged at a distance from each other on the circumference of the circular disk-shaped drive element. This enables collision-free interaction between the locking lever on the one hand and the locking angle lever on the other.

The locking angle lever is generally equipped with a spring-loaded spring arm and additionally with a blocking arm that interacts with the blocking lever. In this context, the spring acting upon the spring arm ensures that, after the blocking lever is released, the blocking element is transferred to its base position, in which it no longer interacts with the blocking lever. This also allows the blocking lever to move to its base position. For this purpose, the blocking lever is advantageously designed as a two-arm lever that can rotate around the pin and is largely elongated.

The locking lever actually has a spring-loaded spring arm and a drive arm that interacts with a contour on the drive element. With the aid of the spring acting upon the spring arm of the blocking lever, the blocking lever is pivoted into its base position as soon as the drive element reaches the blocking position of the blocking lever, and releases the blocking element. That is, after the drive element reaches the blocking position, the locking element and thus also the blocking lever are released. Because a spring is assigned to both the locking element and the blocking lever, both of the aforementioned components pivot into their base position, so that interaction with the drive element in the respective base position is subsequently no longer possible.

As already explained, the drive element has a contour that is used to act upon the blocking lever or its drive arm. A return spring is also advantageously assigned to the contour in question on the drive element. With the aid of this return spring, the drive element is moved from the blocking position to its base position or neutral position. The associated travel path is extremely short compared to a spring-assisted reversing process as in the prior art. This does not impair the performance of the electric motor drive as a whole, because the actuating movement of the electric motor drive is used purely for the actuating process in the context of the invention, and the return spring in question remains unloaded. Only at the end of the reversing movement is the return spring in question, which is assigned to the contour on the drive element, tensioned, then ensuring that the drive element is (slightly) moved from the blocking position to its base position or neutral position. Since, in this base position or neutral position, both the locking lever and the locking element have already been moved to their base position, the electric motor drive can then perform any desired actuating movement from this base position or neutral position.

This is usually done, in detail, in such a way that the drive element, starting from the base position or neutral position in question, opens the locking mechanism in one direction and moves to one or more securing positions of the locking mechanism in a different, opposite direction. The actuating direction for opening the locking mechanism typically corresponds to the actuating movement of the drive element, in which the locking lever is pivoted into its locking position with the aid of the contour on the drive element. In contrast, the one or more securing positions of the locking mechanism are approached in the opposite actuating direction, so that neither the blocking lever nor the locking element are acted upon in this opposite actuating direction.

The invention is based upon the recognition that it is particularly important to be able to use the entire electrical power provided by an electric motor as a component of the electric motor drive for the actuating movement associated with opening the locking mechanism. According to the invention, this is possible and optimized because, in this process, the actuating movement, or the assumption of the actuating position, and specifically the opening of the locking mechanism, is not accompanied by the loading of a spring assigned to the drive element for the reversing movement. Instead, the reversing movement of the drive element takes place in a purely motorized manner and without spring force until the blocking position is reached. That is, in this case and for opening the locking mechanism, the entire electrical power applied by the electric motor as part of the electric motor drive is available.

In contrast, it is not absolutely necessary for the full electrical power of the electric motor drive to be available for the actuating movements in the opposite actuating direction in order to assume the one or more securing positions of the locking mechanism, because the assumption of such securing positions is typically accompanied by the pivoting movement of a coupling lever or also a gate control using a ball pen mechanism, as described in detail, for example, in EP 1 113 133 A1, which has already been referred to. During this process, the return spring assigned to the drive element is typically tensioned and, after assuming the actuating position of the relevant securing position, ensures that the drive element is reversed to its base position or neutral position—this time with spring assistance. As already mentioned, this is easily possible, because assuming the relevant securing positions generally requires significantly less electrical power from the electric motor drive, compared to opening the locking mechanism.

Consequently, the invention takes into account for the first time, and precisely, the different power requirements for a (single) electric motor drive that is used both to open a locking mechanism electrically and for the assumption of one or more securing positions. This also prevents indifferent actuating movements. This is essentially achieved by the invention in that the blocking lever is pivoted into its blocking position by the actuating movement as such and, in particular, by the movement of the drive element for opening the locking mechanism, so that the subsequent reversing movement of the drive element, like the preceding actuating movement, can take place in a purely motorized manner and without spring force until the blocking position is reached.

This also provides mechanically defined stops that suppress indifferent actuating movements. All of this is achieved while taking into account a constructively simple and therefore low-cost design. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
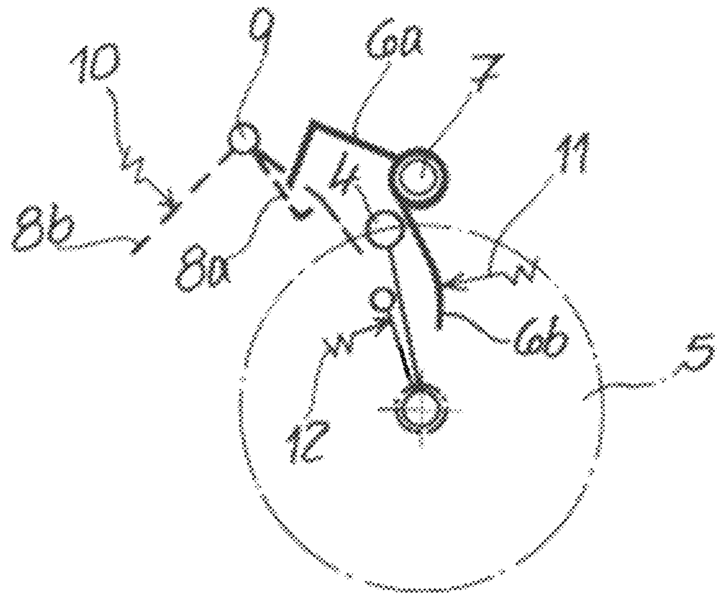
FIGS. 1 to 3 show the motor vehicle lock according to the invention in different functional positions.

The figures show a motor vehicle lock which is not limited to a motor vehicle door lock. Said lock is equipped with a locking mechanism 1, 2, shown and indicated only in FIG. 2, made up substantially of a rotary latch 1 and a pawl 2. In addition, a release lever 3 can be seen purely schematically, which can be actuated and specifically opened with the aid of an electric motor drive 4, 5, 6. The electric motor drive 4, 5, 6 is made up of an electric motor 6, a drive element 5 that is driven by the electric motor 6 and according to the exemplary embodiment is in the shape of a circular disk, and finally a cam 4 on the drive element 5.

Figure 2:
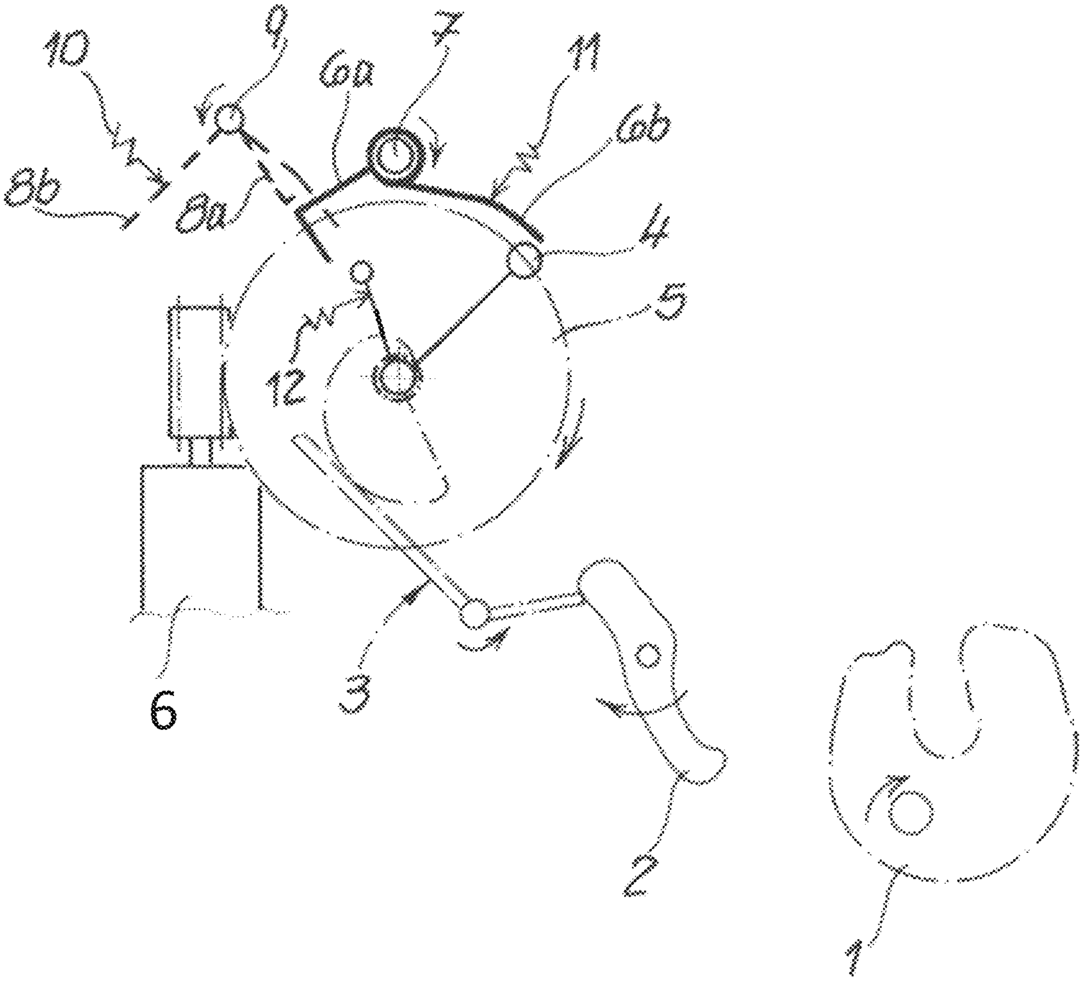

The illustration in FIG. 2 shows how the cam 4 on the drive element 5 is used to electrically open the locking mechanism 1, 2. For this purpose, the drive element 5 is actually pivoted by the electric motor 6 about its central axis in the clockwise direction indicated in FIG. 2, so that, as a result, the contour 4 on the drive element 5 can act upon the release lever 3, which can also pivot about an axis. The clockwise movement of the contour 4 of the drive element 5 results in the release lever 3, which is designed as an angle lever according to the exemplary embodiment, pivoting about its pin in the counter-clockwise direction indicated in FIG. 2, with one end moving against the pawl 2. As a result, the pawl 2 is pivoted clockwise about its pin and releases the rotary latch 1, which was previously held in a latching position with the help of the pawl. The rotary latch 1 then opens in the indicated clockwise direction due to spring or rubber sealing forces, so that a previously held and not explicitly shown locking bolt is released. As a result, the associated motor vehicle door can be opened.

In the exemplary embodiment, the drive element 5 can, with the aid of the electric motor drive 4, 5, 6 or by being acted upon by the electric motor 6, not only perform just the clockwise actuating movements indicated in FIG. 2 for opening the locking mechanism 1, 2. Rather, the drive element 5 can just as well be actuated in the opposite direction, i.e., counter-clockwise, in order in this way to achieve and define one or more possible securing positions, not shown in detail. That is, according to the exemplary embodiment, the clockwise actuating movement of the drive element 4 corresponds to the opening of the locking mechanism 1, 2. In contrast, the counter-clockwise actuating movement of the drive element 5 corresponds to one or more securing positions being realized. According to the invention, this is achieved by using a single electric motor drive 4, 5, 6.

The basic design also includes a blocking element 6*a*, 6*b* for the drive element 4. According to the exemplary embodiment, the blocking element 6*a*, 6*b* is a blocking lever 6*a*, 6*b* rotatable about a pin 7. Furthermore, according to the invention and essential for the following considerations, a locking element 8*a*, 8*b* is also provided. The locking element 8*a*, 8*b* is assigned to the blocking lever 6*a*, 6*b* and holds the blocking lever 6*a*, 6*b* releasably in its blocking position, as explained in more detail below.

The locking element 8*a*, 8*b* is a locking angle lever 8*a*, 8*b* that can be rotated about a pin 9. Of particular importance is the fact that, according to the invention, the blocking lever 6*a*, 6*b*, which can rotate about its pin 7, pivots into its blocking position as a result of an actuating movement of the drive element 5. This can be seen by comparing FIGS. 1 and 2.

The blocking lever 6*a*, 6*b* in FIG. 1 is actually in its base position and is moved to the blocking position shown in FIG. 2 with the aid of the drive element 5, or its contour 4. According to the exemplary embodiment, this corresponds to a clockwise actuating movement of the drive element 5, i.e., (as already explained) an actuating movement such that, in the actuating direction in question (clockwise) of the drive element 4, the locking mechanism 1, 2 is opened. If, on the other hand, the drive element 5 is actuated in its opposite actuating direction, i.e., counter-clockwise in the example, the drive element 5 moves to one or more securing positions of the locking mechanism 1, 2, which is not shown in detail.

Based upon the clockwise actuating movement for opening the locking mechanism 1, 2 of the drive element 5 as shown in FIG. 2, the design here is such that, in accordance with the invention, both the clockwise actuating movement in question and a subsequent counter-clockwise reversing movement of the drive element 5 each take place in a purely motorized manner and without spring force until a blocking position of the blocking lever 6*a*, 6*b* is reached. For this purpose, the design is such that the drive element 5, with its contour 4, acts upon the blocking lever 6*a*, 6*b* starting from the base position or neutral position of the drive element 5 in FIG. 1 in such a way that the blocking lever 6*a*, 6*b* is pivoted about its pin 7 in the counter-clockwise direction indicated there during the transition from FIG. 1 to FIG. 2. As a result, the blocking lever 6*a*, 6*b* pivots into the blocking position shown in FIG. 2.

The longitudinally extended blocking lever 6*a*, 6*b*, which is designed as a two-arm lever, is now held releasably in the blocking position shown in FIG. 2 with the aid of the locking element 8*a*, 8*b* assigned to it. The locking element 8*a*, 8*b* ensures that the blocking lever 6*a*, 6*b* retains the blocking position as shown in FIG. 2 until the drive element or its contour 4 reaches the blocking position and ensures that the locking element 8*a*, 8*b* releases the blocking lever 6*a*, 6*b* during the transition from FIG. 2 to FIG. 3.

For this purpose, the overall design is such that the pin 7 of the blocking lever 6*a*, 6*b* and the pin 9 of the locking angle lever 8*a*, 8*b* are arranged at a distance from each other on the circumference of the circular disk-shaped drive element 5. Furthermore, the locking angle lever 8*a*, 8*b* is equipped with a spring arm 8*b*, acted upon by a spring 10, and in addition with a blocking arm 8*a* interacting with the blocking lever 6*a*, 6*b*.

The blocking lever 6*a*, 6*b* is in turn designed as a two-arm lever 6*a*, 6*b* that can be rotated about the pin 7 and is largely elongated. In fact, the blocking lever 6*a*, 6*b* has a spring arm 6*b*, acted upon by a spring 11, and also a blocking arm 6*a* that interacts with the drive element 5. In this case, the spring arm 6*b* is also designed as the drive arm of the blocking lever 6*a*, 6*b* in such a way that it interacts with the contour 4 on the drive element.

Finally, the design is such that a return spring 12 is assigned to the contour 4 on the drive element 5. The return spring 12 ensures that the drive element 5 is transferred from the blocking position shown in FIG. 3 to a base position or neutral position shown there as a dashed line, as also shown in FIG. 1.

The mode of operation is as follows. Starting from the base position of the electric motor drive 4, 5, 6 in FIG. 1, the actuating movement for opening the locking mechanism 1, 2 corresponds to the drive element 5 being rotated clockwise around its pin with the aid of the electric motor 6. During this clockwise movement, the contour 4 on the drive element 5 ensures on the one hand that the blocking lever 6*a*, 6*b* is moved from its base position as shown in FIG. 1 to the blocking position as shown in FIG. 2. The further progressing clockwise movement of the drive element 5 now causes the release lever 3 to pivot counter-clockwise about its pin with the aid of the contour 4, as described, thereby lifting the pawl 2 from its latching engagement with the rotary latch 1, so that, as a result, the locking mechanism 1, 2 is opened by electric motor action. This functional state is reached at the end of the clockwise movement of the drive element 5 in FIG. 2. It will be understood that the actuation of the blocking lever 6*a*, 6*b* on the one hand and of the release lever 3 on the other cannot necessarily be brought about with the aid of one and the same contour 4 on the drive element 5; rather, different contours can also be used for this purpose, although this is not shown in detail.

Figure 3:
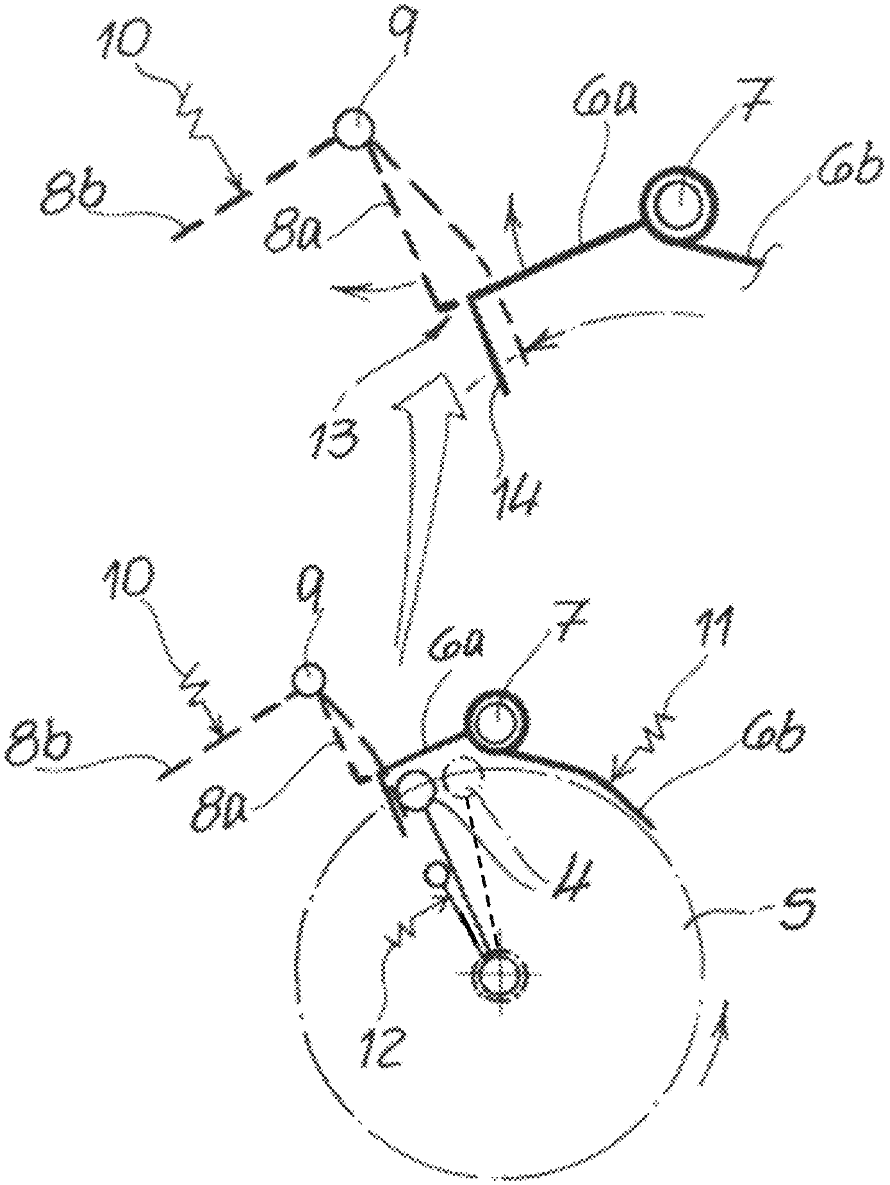

Starting from FIG. 2 and transitioning to FIG. 3, a reversing movement of the electric motor drive 4, 5, 6 is now described. According to the invention, the design here is such that the previously described actuating movement (for opening the locking mechanism 1, 2) and the subsequent reversing movement during the transition from FIG. 2 to FIG. 3 are each carried out purely in motorized fashion and without spring force, with the reversing movement taking place until the blocking position is reached.

The blocking position of the blocking lever 6*a*, 6*b* is assumed because the blocking lever 6*a*, 6*b* is pivoted into the blocking position with the aid of the contour 4 during the actuating movement of the drive element 5, as can be seen from FIG. 2. In addition, the locking element or the locking angle lever 8*a*, 8*b* interacting with the blocking lever 6*a*, 6*b* ensures that the blocking lever 6*a*, 6*b* is held in the blocking position as shown in FIG. 2. For this purpose, the locking angle lever 8*a*, 8*b* is equipped with a locking contour 13, into which a blocking lug 14 of the blocking lever 6*a*, 6*b* engages releasably.

As soon as, during a reversing movement of the electric motor drive 4, 5, 6 and consequently a counter-clockwise movement of the drive element 5 starting from the functional position in FIG. 2, the contour 4 on the drive element 5 according to FIG. 3 has reached the blocking position and thus the blocking lug 14 of the blocking lever 6*a*, 6*b*, the blocking element, or blocking angle lever 8*a*, 8*b*, is released. This is because this process results not just in the electric motor 6, as a component of the electric motor drive 4, 5, 6, being switched off by the block travel associated with reaching the blocking position and an associated increase in current. Rather, at the same time, the contour 4 on the drive element 5 ensures that the blocking arm 8*a* of the locking angle lever 8*a*, 8*b* is acted upon by the contour 4 in such a way that the blocking lug 14 can disengage from the locking contour 13. This is ultimately ensured by the spring 11 acting upon the blocking lever 6*a*, 6*b* and engaging on the spring arm 6*b*, which spring pretensions the blocking lever 6*a*, 6*b* in the direction of its base position shown in FIG. 1, i.e., clockwise around the pin 7, according to the exemplary embodiment.

As soon as the locking angle lever 8*a*, 8*b* has released the blocking lever 6*a*, 6*b*, both the locking angle lever 8*a*, 8*b*-acted upon by its spring 10—and the blocking lever 6*a*, 6*b* can each pivot back to their base position by being acted upon by the spring 11, as shown in FIG. 1. This is indicated by corresponding arrows in FIG. 3. This is because this return pivot movement in each case corresponds to an associated clockwise rotation of the locking angle lever 8*a*, 8*b* on the one hand, and of the blocking lever 6*a*, 6*b* on the other.

After the electric motor drive 4, 5, 6 has been switched off by reaching the blocking position in FIG. 3, the drive element 5 is transferred from the blocking position to the base position or neutral position according to FIG. 1 with the aid of the return spring 12 assigned to the drive element 5, as is also indicated by the dash-dotted line in FIG. 3. The electric motor drive 4, 5, 6 is now back in its base position or neutral position as shown in FIG. 1. This can be followed by a new electrical opening process of the locking mechanism 1, 2, or it is possible to move to one or more securing positions, not shown, when there is an actuating movement of the drive element 5, counter-clockwise starting from the base position.

These securing positions can be the functional positions "locked/unlocked," "child-secured/child-unsecured," or "theft-secured/theft-unsecured" specified in the introduction to the description, either individually or in combination. For this purpose, the slide control or the ball pen mechanism according to EP 1 113 133 A1 may be used.

As a result, at least two functions can be realized with the aid of the electromotive drive 4, 5, 6, viz., the described electrical opening of the locking mechanism 1, 2 and, in addition, a further functional position or the assumption of the aforementioned securing positions. All of this is possible, particularly in connection with the electromotive opening of the locking mechanism 1, 2, without any loss of power during the opening process, because the associated actuating movement and the subsequent reversing movement of the drive element 5 each take place in a purely motorized manner and without spring force until the blocking position is reached.

LIST OF REFERENCE SIGNS

1, 2 Locking mechanism
1 Rotary latch
2 Pawl
3 Release lever
4, 5, 6 Drive
4 Cam
4 Contour
4 Drive element
5 Drive element
6*a*, 6*b* Blocking element
6*a*, 6*b* Blocking lever
6*a* Blocking arm
6*b* Spring arm
7 Pin
8*a*, 8*b* Blocking element
8*a*, 8*b* Blocking angle lever
8*a* Blocking arm
8*b* Spring arm
9 Pin
10 Spring
11 Spring
12 Return spring
13 Locking contour
6 Electric motor

The invention claimed is:

1. A motor vehicle lock comprising:

a locking mechanism including a rotary latch and a pawl, and an electromotive drive which performs actuating movements on a release lever that acts on the locking mechanism, the electromotive drive including a drive element and a blocking element for the drive element, and a locking element, wherein the blocking element includes a blocking lever which is rotatable about a pin and which pivots into a blocking position by an actuating movement of the drive element and pivoting movement of the locking element, so that the actuating movement and a subsequent reversing movement of the drive element are performed in a motorized manner and without spring force until the blocking position is reached, wherein the blocking lever interacts with the locking element which holds the blocking lever releasably in the blocking position, and wherein the locking element is a locking angle lever rotatable about a second pin.

2. The motor vehicle lock according to claim 1, wherein the locking element releases the blocking lever when the drive element reaches the blocking position.

3. The motor vehicle lock according to claim 1, wherein the drive element is circular disc-shaped, and wherein the pin of the blocking lever and the second pin of the locking angle lever are arranged at a distance from one another on a circumference of the drive element.

4. The motor vehicle lock according to claim 1, further comprising a first spring, wherein the locking angle lever is equipped with a spring arm acted upon by the first spring, and a blocking arm interacting with the blocking lever.

5. The motor vehicle lock according to claim 1, wherein the blocking lever is an elongated a two-arm lever which is rotated about the pin.

6. The motor vehicle lock according to claim 5, further comprising a spring, wherein the blocking lever has a spring arm acted upon by the spring, and a blocking arm interacting with the drive element.

7. The motor vehicle lock according to claim 1, further comprising a return spring, wherein a contour on the drive element interacts with the return spring which transfers the drive element from the blocking position to a base position.

8. The motor vehicle lock according to claim 7, wherein the drive element opens the locking mechanism starting from the base position in a first actuating direction, and moves the locking mechanism to one or more securing positions of the locking mechanism in a second actuating direction opposite from the first actuating direction.

9. A motor vehicle lock comprising:

a locking mechanism including a rotary latch and a pawl, and an electromotive drive which performs actuating movements on a release lever that acts on the locking mechanism, the electromotive drive including a drive element and a blocking element for the drive element, and a locking element, wherein the blocking element includes a blocking lever which is rotatable about a pin and which pivots into a blocking position by an actuating movement of the drive element and pivoting movement of the locking element, so that the actuating movement and a subsequent reversing movement of the drive element are performed in a motorized manner and without spring force until the blocking position is reached, wherein the blocking lever interacts with the locking element which holds the blocking lever releasably in the blocking position, wherein the blocking lever is an elongated a two-arm lever which is rotated about the pin, further comprising a spring, wherein the blocking lever has a spring arm acted upon by the spring, and a blocking arm interacting with the drive element.

10. A motor vehicle lock comprising:

a locking mechanism including a rotary latch and a pawl, and an electromotive drive which performs actuating movements on a release lever that acts on the locking mechanism, the electromotive drive including a drive element and a blocking element for the drive element, and a locking element wherein the blocking element includes a blocking lever which is rotatable about a pin and which pivots into a blocking position by an actuating movement of the drive element and pivoting movement of the locking element, so that the actuating movement and a subsequent reversing movement of the drive element are performed in a motorized manner and without spring force until the blocking position is reached, wherein the blocking lever interacts with the locking element which holds the blocking lever releasably in the blocking position, further comprising a return spring, wherein a contour on the drive element interacts with the return spring which transfers the drive element from the blocking position to a base position.

11. The motor vehicle lock according to claim 10, wherein the drive element opens the locking mechanism starting from the base position in a first actuating direction, and moves the locking mechanism to one or more securing positions of the locking mechanism in a second actuating direction opposite from the first actuating direction.

* * * * *